(12) United States Patent
Fitzek et al.

(10) Patent No.: US 9,077,398 B2
(45) Date of Patent: Jul. 7, 2015

(54) NETWORK CODING BY BEAM FORMING

(75) Inventors: Frank Fitzek, Aalborg (DK); Janus Heide, Aalborg (DK); Morten Pedersen, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 13/984,892

(22) PCT Filed: Feb. 22, 2011

(86) PCT No.: PCT/IB2011/000362
§ 371 (c)(1),
(2), (4) Date: Aug. 12, 2013

(87) PCT Pub. No.: WO2012/114141
PCT Pub. Date: Aug. 30, 2012

(65) Prior Publication Data
US 2013/0315338 A1 Nov. 28, 2013

(51) Int. Cl.
*H04B 7/04* (2006.01)
*H04B 7/06* (2006.01)
*H04L 1/06* (2006.01)
*H04B 7/02* (2006.01)
*H04L 1/00* (2006.01)

(52) U.S. Cl.
CPC ............ *H04B 7/0408* (2013.01); *H04B 7/0617* (2013.01); *H04L 1/06* (2013.01); *H04B 7/024* (2013.01); *H04L 2001/0092* (2013.01)

(58) Field of Classification Search
CPC .... H04B 7/0408; H04B 7/0617; H04B 7/024; H04L 1/06; H04L 2001/0092
USPC .......................................... 375/267, 299, 347
See application file for complete search history.

(56) References Cited

U.S. PATENT DOCUMENTS

2007/0149117 A1 6/2007 Hwang et al.
2007/0155336 A1 7/2007 Nam et al.
(Continued)

FOREIGN PATENT DOCUMENTS

| WO | 2009026695 A1 | 3/2009 |
| WO | 2010019340 A1 | 2/2010 |
| WO | 2011035797 A1 | 3/2011 |

OTHER PUBLICATIONS

International Search Report and Written Opinion received for corresponding Patent Cooperation Treaty Application No. PCT/IB2011/000362, dated Dec. 1, 2011, 13 pages.

*Primary Examiner* — Leon Flores
(74) *Attorney, Agent, or Firm* — Squire Patton Boggs (US) LLP

(57) ABSTRACT

Network coding by beam forming in networks, for example, in single frequency networks, can provide aid in increasing spectral efficiency. When network coding by beam forming and user cooperation are combined, spectral efficiency gains may be achieved. According to certain embodiments, a method includes operating a user equipment of a plurality of user equipment in a network comprising a plurality of access points. The method also includes the user equipment forming a beam. The method further receives processing received signals from at least one of the plurality of access points at the user equipment. The forming the beam is configured to let different user equipment of the plurality of user equipment to receive different signals from the plurality of access points to achieve diversity by using different beams amongst the plurality of user equipment. The method additionally includes cooperating with the plurality of user equipment to decode the received data.

20 Claims, 12 Drawing Sheets

(56) References Cited

U.S. PATENT DOCUMENTS

| | | | |
|---|---|---|---|
| 2009/0190488 A1* | 7/2009 | Hochwald et al. | 370/252 |
| 2010/0246560 A1* | 9/2010 | Kim | 370/345 |
| 2011/0149835 A1 | 6/2011 | Shimada et al. | |
| 2012/0231739 A1* | 9/2012 | Chen et al. | 455/41.2 |

* cited by examiner

NETWORK CODING BY BEAM FORMING

BACKGROUND

1. Field

Network coding by beam forming in networks, for example, in single frequency networks, can provide aid in increasing spectral efficiency. When network coding by beam forming and user cooperation are combined, spectral efficiency gains may be achieved.

2. Description of the Related Art

In current wireless and mobile communication system scarcity of spectrum can only be addressed by efficient use of spectrum resources. One possibility for high spectral efficiency is to offer broadcast or multicast services. Due to the error prone wireless link, error recovery mechanisms are used within the communication system in order to make the application level reception robust. Currently there are several error recovery mechanisms available, such as the usage of Raptor codes. Network coding is able to correct errors in wireless communication systems, but is useless if no errors occur in point to point or point to multi-point networks.

In the case of a single frequency network (SFN), various factors exist. In state of the art setups, for example, multiple base stations are transmitting the same information at the same time. The multiple signals are then combined at the mobile device. In a state of the art system, all mobile device in coverage of the single frequency network receive the same information if transmission was successful.

SUMMARY

According to certain embodiments, a method includes operating a user equipment of a plurality of user equipment in a network comprising a plurality of access points. The method also includes forming a beam by the user equipment. The method further receives processing received signals from at least one of the plurality of access points at the user equipment. The forming the beam is configured to let different user equipment of the plurality of user equipment to receive. different signals from the plurality of access points to achieve diversity by using different beams amongst the plurality of user equipment. The method additionally includes cooperating with the plurality of user equipment to decode the received data.

An apparatus according to certain embodiments includes at least one processor and at least one memory including computer program code. The at least one memory and computer program code are configured to, with the at least one processor, cause the apparatus at least to operate a user equipment of a plurality of user equipment in a network comprising a plurality of access points. The at least one memory and computer program code are configured to, with the at least one processor, cause the apparatus at least to form a beam by the user equipment. The at least one memory and computer program code are configured to, with the at least one processor, cause the apparatus at least to process received signals from at least one of the plurality of access points at the user equipment. Formation of the beam is configured to let different user equipment of the plurality of user equipment to receive different signals from the plurality of access points to achieve diversity by using different beams amongst the plurality of user equipment. The at least one memory and computer program code are configured to, with the at least one processor, cause the apparatus at least to cooperate with the plurality of user equipment to decode the received data.

An apparatus according to certain embodiments includes controlling means for operating a user equipment of a plurality of user equipment in a network comprising a plurality of access points. The apparatus also includes beamforming means for forming a beam by the user equipment. The apparatus further includes processing means for processing received signals from at least one of the plurality of access points at the user equipment. The forming the beam is configured to let different user equipment of the plurality of user equipment to receive different signals from the plurality of access points to achieve diversity by using different beams amongst the plurality of user equipment. The apparatus additionally includes coordinating means for cooperating with the plurality of user equipment to decode the received data.

In certain embodiments a computer readable medium is encoded with instructions that, when executed in hardware, perform a process. The process includes operating a user equipment of a plurality of user equipment in a network comprising a plurality of access points. The process also includes forming a beam by the user equipment. The process further includes processing received signals from at least one of the plurality of access points at the user equipment. The forming the beam is configured to let different user equipment of the plurality of user equipment to receive different signals from the plurality of access points to achieve diversity by using different beams amongst the plurality of user equipment. The process additionally includes cooperating with the plurality of user equipment to decode the received data.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
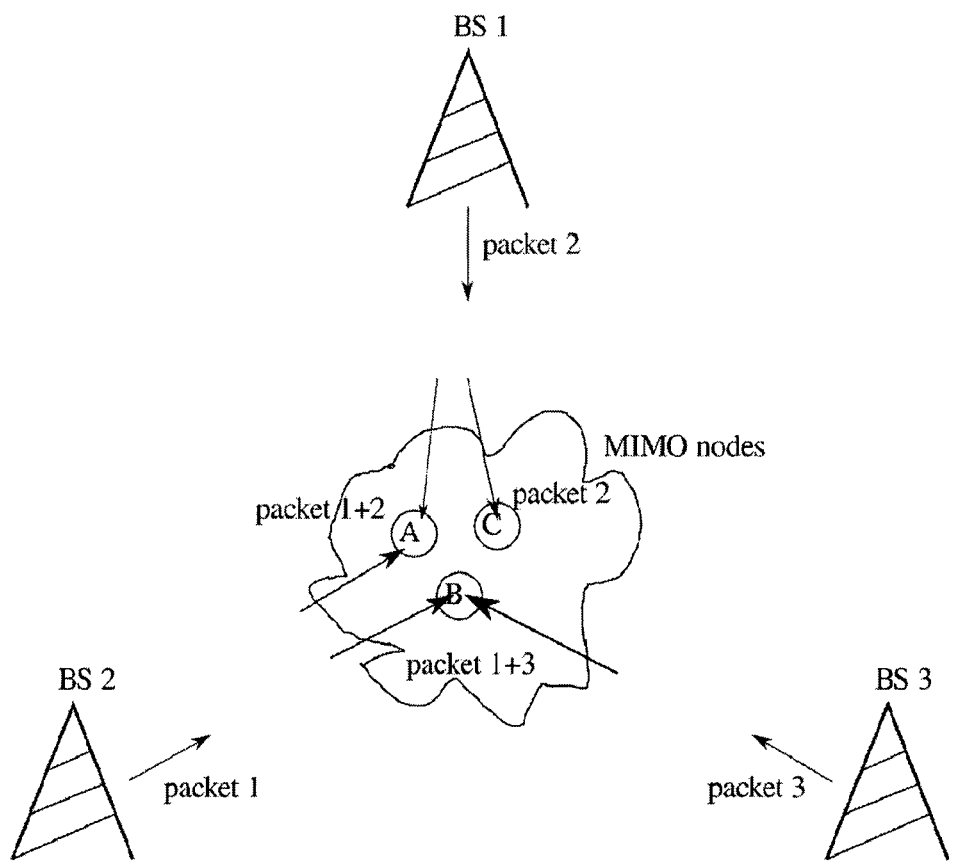
FIG. 1 illustrates an arrangement of J base stations with K cooperating devices (J=3 and K=3).

Network coding and user cooperation can increase spectral efficiency beyond that provided by the use of broadcast and multicast services alone. In particular, certain embodiments of the present invention employ network coding by beam forming in combination with end-user cooperation, such as cooperation among members of a cluster of devices. Mobile devices will be discussed herein as examples of end-user devices, but it should be understood that it is not necessary for the devices to be mobile. Stationary, fixed location devices may be used in accordance with certain embodiments.

Network coding can be used to correct packet errors. Random linear network coding can be done, for example, by transmitting the data in two stages, in the first stage the source transmits all packets uncoded. In the second stage, there is a correction of packet losses which have occurred during the first stage. The source creates and sends random linearly combinations of the original data. By using this approach, one coded packet carries information which can potentially correct different errors at different nodes simultaneously.

The main idea of user cooperation is that mobile devices that are in close proximity to each other can exchange information of the same broadcast service to help each other. In addition to this cooperation, network coding helps to overcome the collector's problem or in other words, it makes the exchange among the cooperative cluster very efficient. The proposed solution is working fine in the presence of errors in the transmission. In case no error occurs, the cooperative cluster is just receiving redundant information and here some potential improvement is possible.

Certain embodiments of the present invention can improve the spectral efficiency for cooperative clusters using network coding. In the following discussion, a specific example of a network setup as it can be found nowadays in the mobile communication world is used by way of example. It should be understood that the invention is not limited to this specific example, but this specific example is used for purposes of illustration. A second example from an optical communication environment is also provided, and it should be understood that additional embodiments can be made in other areas based on the teachings found herein.

Thus, in a first example, a network is a single frequency network. As mentioned above, in a single frequency network, multiple base stations can be transmitting the same information at the same time. The multiple signals can then be combined at the mobile device. In the case of successful transmission, all mobile devices within the coverage of the single frequency network can receive the same multicast or broadcast information.

The mobile devices may be a cooperative cluster of devices. One way to increase the spectral efficiency of the cooperative cluster, is for the base stations to transmit different packets at the same time, which are then coded in the air. This may be referred to as physical network coding.

In FIG. 1, a possible scenario with three base stations and three mobile devices is given. When the base stations are transmitting three different packets (1, 2, and 3), each mobile device would receive a coded packet of (1+2+3) as the omni-directional antenna is receiving from all angles.

A comparison of the two approaches (single frequency network without physical network coding compared to single frequency network with physical network coding), shows that no gain in spectral efficiency is achieved simply by this step of physical network coding. However, this step can serve as a preparation step for a next step, even prior to cooperation.

Instead of each mobile devices seeking to receive a combination of all of the packets over the air interface from the base stations, each mobile device can seek to obtain a subset. Specifically, the mobile device can seek to obtain a subset for use in making a later exchange among mobile device. Beam forming at the mobile device is one technique that can be used to filter the subset of packets that can be recombined. Beam forming at the mobile side can be done in a straightforward way (see FIG. 2-FIG. 6).

Figure 2:
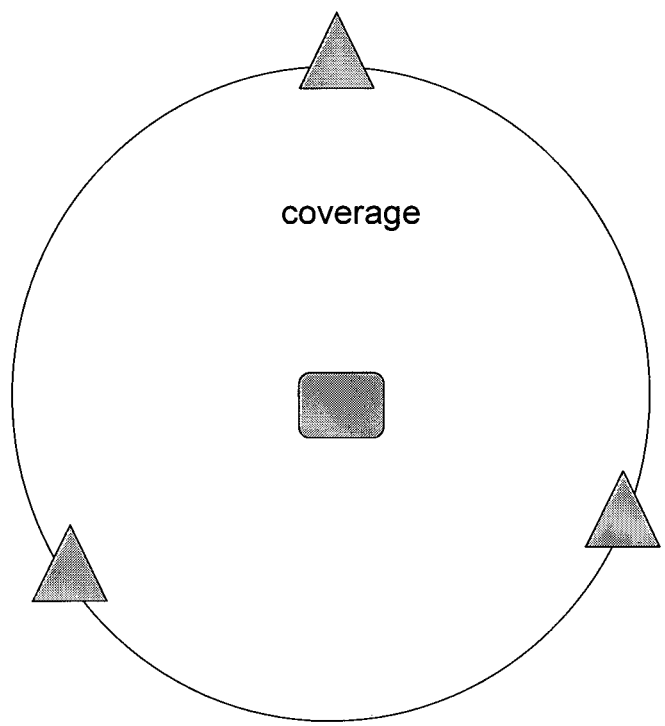
FIG. 2 illustrates each mobile device listening to only one base station.
Figure 3:
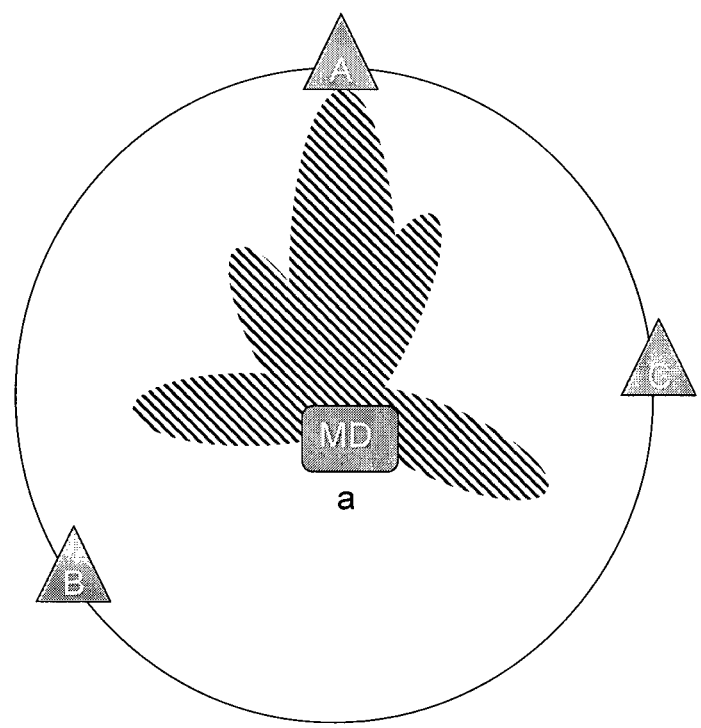
FIG. 3 illustrates one possible random beam that receives a packet a from base station A.
Figure 4:
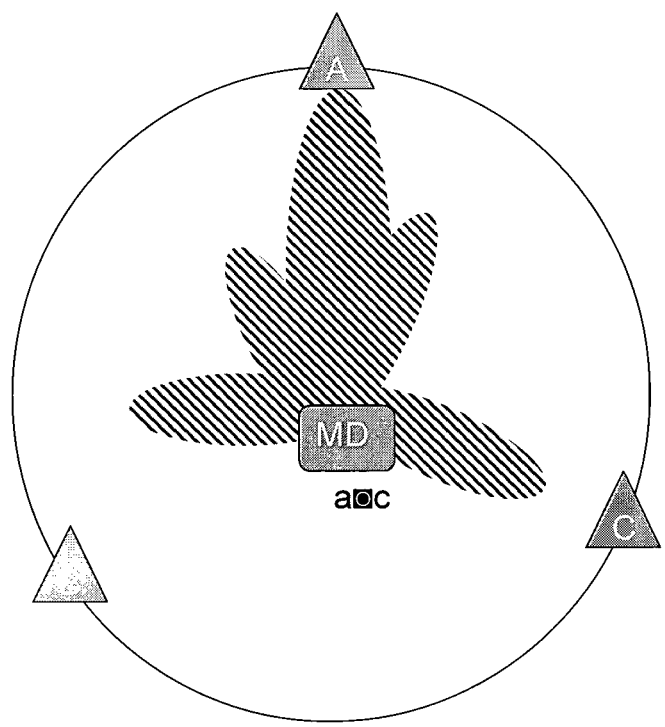
FIG. 4 illustrates one possible random beam that receives packets a and c from base stations A and C, respectively.
Figure 5:
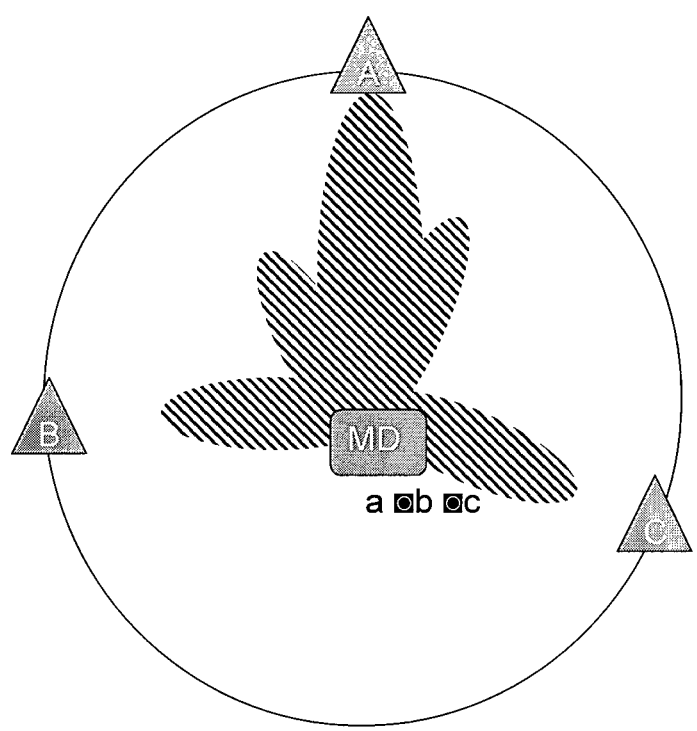
FIG. 5 illustrates one possible random beam that receives packets a, b and c from base stations A, B and C, respectively.

FIG. 2 shows ideal beam forming towards one base station. FIGS. 3, 4, and 5, in contrast, show more complex beams that will receive from a subset of base stations.

Figure 6:
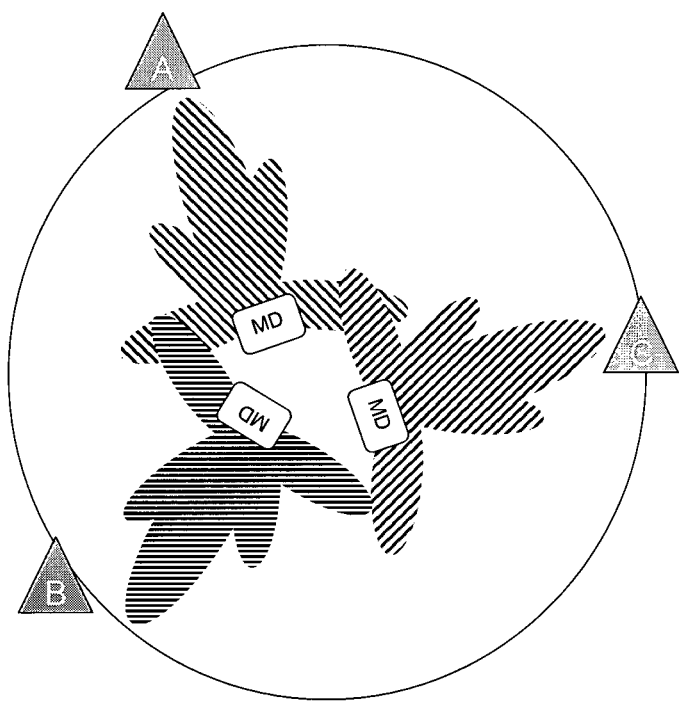
FIG. 6 illustrates three mobile devices with three different beams.

FIG. 6 illustrates a cooperative cluster in which each device tries to form different beams to different base stations.

Handheld devices, such as mobile phones or smartphones, can be equipped with multiple antenna elements. These multiple antenna elements can be used for doing antenna beam forming. In one case, each device would form a beam directed discretely towards disjoint base stations. For example, mobile device 1 would be listening to base station 1 to receive packet number 1, mobile device 2 would be listening to base station 2 to receive packet number 2, and so on. In this way, the cluster can get the full information right away (3 packets in one time slot) and can use a local exchange to disseminate that information amongst the cluster members.

Forming beams that so precise as to receive signals only from a signal base station may be quite complex, especially for mobile devices that must also permit mobility of the user. However, an alternative implementation is also possible. In an alternative situation, each mobile device is doing a random antenna pattern, where the goal is to get a subset of the base stations only. There is no need to perform ideal beam forming, but random beam forming can still provide diversity.

A random beam can be formed in different ways. For example, a beam can be formed at a random azimuth of the compass, or the beam can be formed to be directed to a random base station. If the mobile station does not know the direction of the base station, then the random direction approach may be more convenient.

In FIG. 2, different possibilities for a mobile device (MD) are shown. It may happen the mobile device receives an original packet from base station A (FIG. 3), or a combined packet out of a and c (FIG. 4), or a combination of a, b, and c (FIG. 5). These examples are simply some possible implementations, not a requirement.

A cooperative cluster including multiple mobile devices that are all forming random beam patterns, can receive linear independent information in the best case. Of course, there is the risk that linear dependent information is received (e.g. all mobile devices are receiving from base station 1), and a possible way to avoid that situation is discussed below.

Despite the fact the information can be conveyed to a cooperative cluster in a faster way, energy saving can also be achieved by the scheme. The primary air interface is using more energy per bit than the secondary air interface, because the physical law of radio propagation generally means that short range transmissions are more energy efficient than long range transmissions. Thus, cooperation among mobile devices as a substitute for base station to mobile device communication may generally provide an energy savings gain. If the base stations are supporting a variety of cooperative clusters as well as stand alone devices, energy saving is possible on both the mobile side and the network side.

The energy saving on the mobile side is clear and depends on the number of cooperating devices. As will be discussed below, the more cooperating devices can be found, the larger the energy saving gain for the individual cluster. But as explained below, the network provider can gain with every cooperating cluster even in presence of non cooperating devices as the redundant transmissions by the base station may be reduced due to the presence of cooperating clusters.

Considering the situation where no cooperation is taking place, the redundancy added by the base station is increasing with the number of non-cooperating mobile devices. But as soon as mobile devices form a cooperative cluster, those devices can be taken out of the redundancy considerations as they will heal the errors locally and therefore the redundancy introduced by the base station is decreased. Therefore, certain embodiments of the present invention may permit an energy savings on both the mobile device side and the network side.

Optical communications can also receive benefit from certain embodiments of the present invention. For example, in certain embodiments an optical filter can be used to receive a subset of the transmitted wavelengths. Thus, by receiving from a blue and yellow transmitter, the node can receive green information. The remaining details of the system may be worked out according to the example previously provided.

Certain embodiments of the present invention may have various advantages. For example, certain embodiments may result in increasing the information immediately available to a cooperative cluster. Moreover, certain embodiments may increase the performance of any cooperative cluster of any size, without decreasing the performance of non-cooperative users.

Additionally, in certain embodiments the random encoding vector can be determined by the random antenna beam. This can reduce the complexity of the system design, and can reduce the need for explicit coordination among the mobile devices.

Moreover, certain embodiments involve the transmission of coded packets from the base stations in order to make the cluster information more valuable. In other words, the use of coded packets from the base station can lead to performance benefits in the cluster, since the cluster can employ an appropriate strategy for addressing the coded packets.

The number of cooperative partners and available base stations can have an impact on the antenna beam that is to be created. In general, the more cooperative partners and fewer base stations, the more that beams can be formed to provide independent signals.

An optional feature of certain embodiments can include evaluating, by the mobile devices, the linear independency of the received information. If there is too much linear dependency a new beam can be created.

Figure 7:
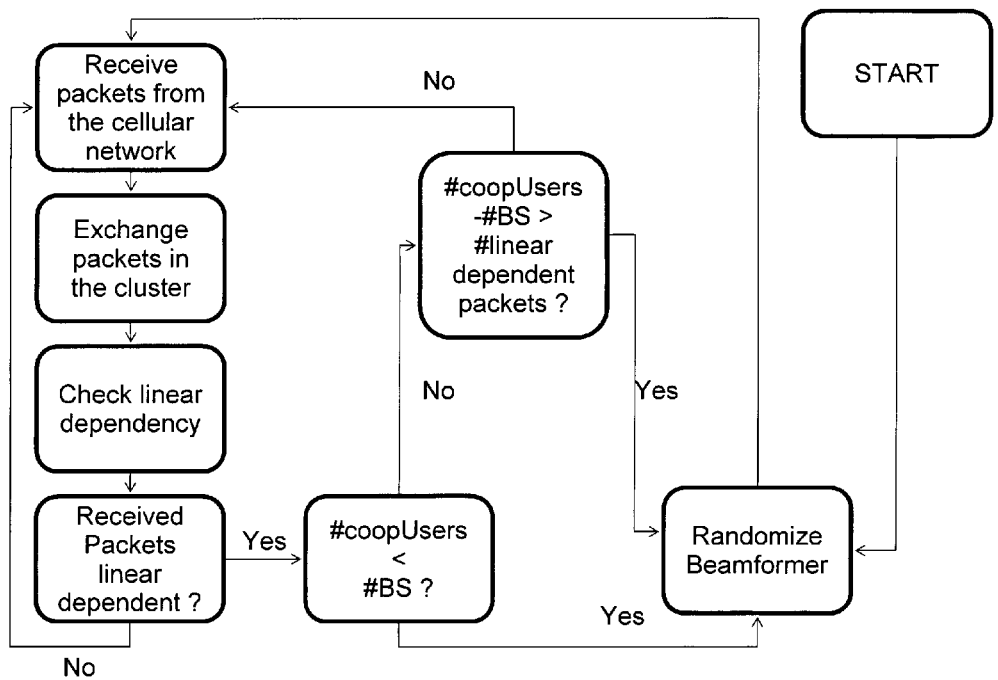
FIG. 7 illustrates a procedure, according to certain embodiments of the present invention, for individual devices to go for a new beam or stay tuned to the old beam, based on the linear dependency of the received packets.

An apparatus according to certain embodiments can choose how the beam forming is done based on the number of information sources (for example, base stations) and the number of cooperating devices (for example, cluster members). FIG. 7 illustrates such an embodiment.

Certain embodiments of the present invention permit cooperative clusters to achieve the data from the base station much faster compared to the stand alone devices. Due to this fact they can switch off their primary air interface and save energy. More discussion of the energy saving for cooperative clusters over non-cooperative devices is provided below.

The proposed scheme has the potential to save energy on the network side as well. Due to the cooperative clusters, the overall redundancy for the cell (including both cooperative and non-cooperative devices) can be reduced to a minimum and therefore the network can save bandwidth and energy. There is discussion below regarding the energy saving for the network provider in the case in which different cluster formation are present.

Various embodiments of the present invention can be implemented in accordance with the understanding of one of ordinary skill in the art. The following examples are simply illustrations of possible implementations, and are not limiting. Moreover, the transmission mechanism discussed is not limited to radio communication but could also be used for optical communication, as mentioned above.

In the case of radio communication, the mobile devices can be equipped to have the possibility to form antenna beams and not simply equipped with omnidirectional antennas. There is no special need for the beams. However, the beams can serve to filter out at least one base station out of a plurality of available base stations, in order to get a subset of the combined information. On the network side, base stations can convey information towards the mobile devices in a synchronized way, performing physical network coding. This synchronization can be achieved in various ways on the network side, such as by the use of one or more base station controllers.

FIG. 7 illustrates a beam selection apparatus. For illustration purposes, the apparatus is presented as operating in an overlay network with a number (J) of base stations sending information towards a number (K) of mobile devices using a primary air interface. Each mobile device is, in this example, able to form a beam to receive combined information from j (smaller than or equal to J) base stations. The K mobile devices are able to communication with each other using a second air interface. The information from each base station can be received as a combined signal filtered by the antenna beam of each mobile device.

A beam form approach can be applied, such that each mobile device is using a randomized beam initially. The mobile devices can then receive coded information. After exchanging the information received from the primary air interface over the second air interface, the mobile devices can check the linear dependency of the received information. If there are no linear dependencies, the beams are already sufficiently precisely formed and can stay as selected initially. Nevertheless after each cooperative reception, the dependencies can be checked in order to make sure that the beams are still acceptable, or at least above some threshold of acceptability. The threshold of acceptability may depend on the size of the cluster relative to the number of base stations. If the number of base stations is similar to the number of mobile devices, a higher degree of independence may be desirable. However, if the number of mobile devices is quite large compared to the number of base stations, a much lower level of dependence may be acceptable.

When linear dependent packets are received, it can be checked whether the number of cooperating devices (K) is smaller than the number of base stations (J). If both linear dependency and K smaller J is true, the mobile devices can form a new beam. Whether all devices are doing beam forming, or whether a subset is doing beam forming, can be varied in various implementations. If K is equal to or larger than J, a new beam may only be formed when K-J is larger than the number of linear dependent packets. When K-J is smaller than the number of linear dependent packets, and K is equal to or larger than J, it may be that no new beams are formed.

As noted above, certain embodiments of the present invention may be able to increase the spectral efficiency of the proposed cooperative communication by increasing the valuable information per node using network coding.

In the following, an illustrative comparison is provided among different approaches. An example of transmitting three packets from the network to the mobile devices is used, although this is simply for purposes of illustrating the principles involved. In the cooperative case, the three mobile devices stand close together. They have two air interfaces, a first one for the reception of the network information and a second one to exchange cooperative information. This situation can be treated as two different networks. The second air interface can be high in data rate and can use a low energy amount.

Three approaches can be contrasted. Approach 1 is a state of the art approach using a single frequency network. In this example, each base station is sending the same information at the same time as one another. For three packets, the network would need three time slots, assuming there are no errors in transmission. Each error would lead to retransmissions.

Approach 2 is an approach in which user cooperation is enabled. In this example, the network still sends the same information from the base station. Without errors even here three time slots are needed to transmit three packets. In the case of errors in transmission, user cooperation can help to reduce the number of retransmissions needed.

Approach 3 is an approach that further includes beam forming. The beam forming does not have to be very advanced or precise. If the three mobile devices get different coded packets, the cooperative cluster can have the full information after the first time slot. Subsequently, exchange within the cluster can ensure that all cluster members get all of the information.

A small performance evaluation can be carried out for the radio case of a single frequency network. In an error free communication scenario, in which all cooperating mobile devices (K) are receiving information from J base stations, the best case capacity gain can be described as follows:

Capacity gain=min(number of base stations,number of cooperating devices)

Thus, in a situation where the number of cooperating devices outperforms the number of base stations, there is no chance to inject more linear independent information. In the other case, where the number of mobile cooperating devices is smaller than the number of base stations, the limit is set by the incoming linear dependent information.

Figure 8:
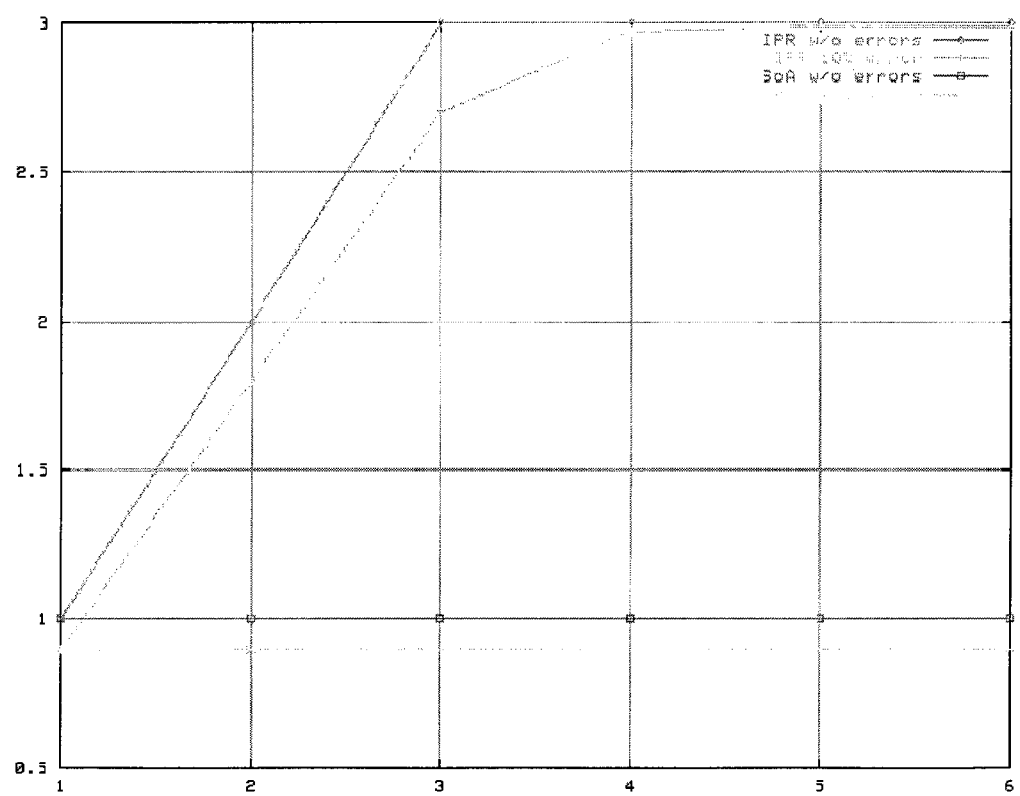
FIG. 8 illustrates performance for J=3 and K=1.6 for error free and error prone cases.
Figure 9:
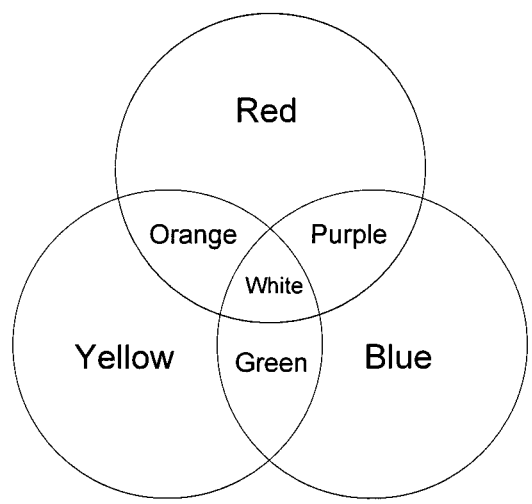
FIG. 9 illustrates an embodiment in optical communication.

In FIG. 8, the capacity gain for J=3 and a varying number of cooperating devices ranging from 1 to 6 is given for an error-free and an error-prone scenario. In the error free scenario, the capacity gain is increasing with an increasing number of cooperating devices until the number of mobile devices equals the number of base stations (J=K=3). Even if the number of cooperating devices is increasing over three, there is no further capacity gain. Only when the link from the base station to the mobile devices is error prone, an increasing number of cooperating devices helps further.

Figure 10:
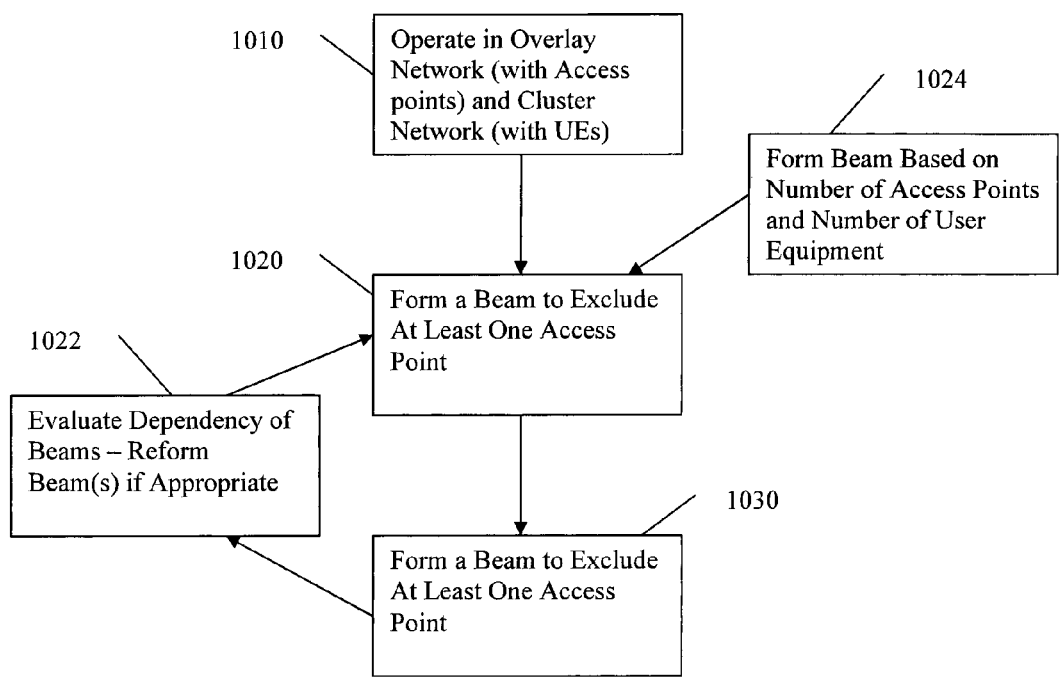
FIG. 10 illustrates a method according to certain embodiments of the present invention.

FIG. 10 illustrates a method according to certain embodiments of the present invention. As illustrated in FIG. 10, a method can include, at 1010, operating a user equipment device in a first network that includes a plurality of access points and a second network that includes a plurality of user equipment (UEs). The user equipment can be mobile devices, smartphones, or other terminal equipment. The plurality of user equipment can be a cluster of devices. The access points can be base stations. The plurality of user equipment can be configured to cooperate in reception of transmissions on the first network. The first network can be a radio access network, whereas the second network can be a local area network of a cluster.

The method can further include, at 1020, forming a beam by the user equipment. Forming the beam can be configured to prevent reception of at least one of the plurality of access points. The forming the beam can be done in a random manner. For example, the random manner can either be forming the beam in a random direction or forming the beam to point at a random access point. The forming the beam can include selecting a beam that receives signals from only one base station. In other words, the beam formation can filter out all of the base stations except one. The forming the beam can be performed repeatedly based on information received from the plurality of the user equipment. In other words, if a beam formation for either the whole cluster or an individual cluster member seems to be unacceptable the cluster or individual member can re-form its beam.

The method can also include, at 1022, evaluating, by the user equipment, the linear dependency of the signals received on the beam. When linear dependency exceeds a threshold a new beam can be created, and when linear dependency does not exceed a threshold, the existing beam can be maintained.

The method can also include, at 1024, choosing the forming of the beam based on a total number of the access points and a total number of the plurality of the user equipment.

Moreover, the method can include, at 1030, cooperatively processing signals received on the beam. The signals received on the beam can include multicast or broadcast signals.

Figure 11:
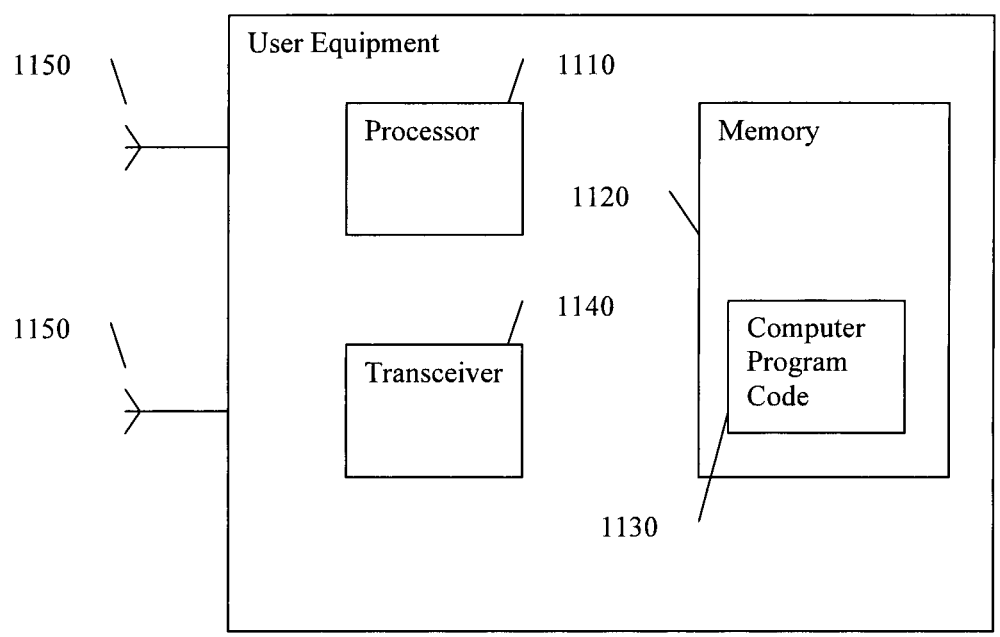
FIG. 11 illustrates an apparatus according to certain embodiments of the present invention.

FIG. 11 illustrates an apparatus according to certain embodiments of the present invention. As shown in FIG. 11, an apparatus, which may be a user equipment, can include at least one processor 1110, at least one memory 1120, including computer program code 1130, and at least one transceiver 1140. The at least one processor 1110 can be one or more controllers, central processing units (CPUs), or other processing devices. The at least one memory 1120 can be any kind of suitable storage device, such as random access memory (RAM) or read only memory (ROM), variously embodied, such as on a hard disk drive. The memory 1120 can be on the same chip as the processor 1110. The computer program code 1130 can be any suitable computer-readable instructions, such as compiled code or interpreted code.

The transceiver 1140 can be a reception and transmission device, or a combination or reception and transmission devices. The transceiver 1140 can include multiple transceivers, and can be configured to operate on two different networks. Additionally the transceiver 1130 can be configured to operate using a plurality of antennas 1150 (two shown).

The transceiver 1140 can be configured to perform beamforming using the antennas 1150, either autonomously or based on the control of the processor 1110. The apparatus of FIG. 11 can be configured, for example, to perform the methods illustrated in FIGS. 10 and 12.

Figure 12:
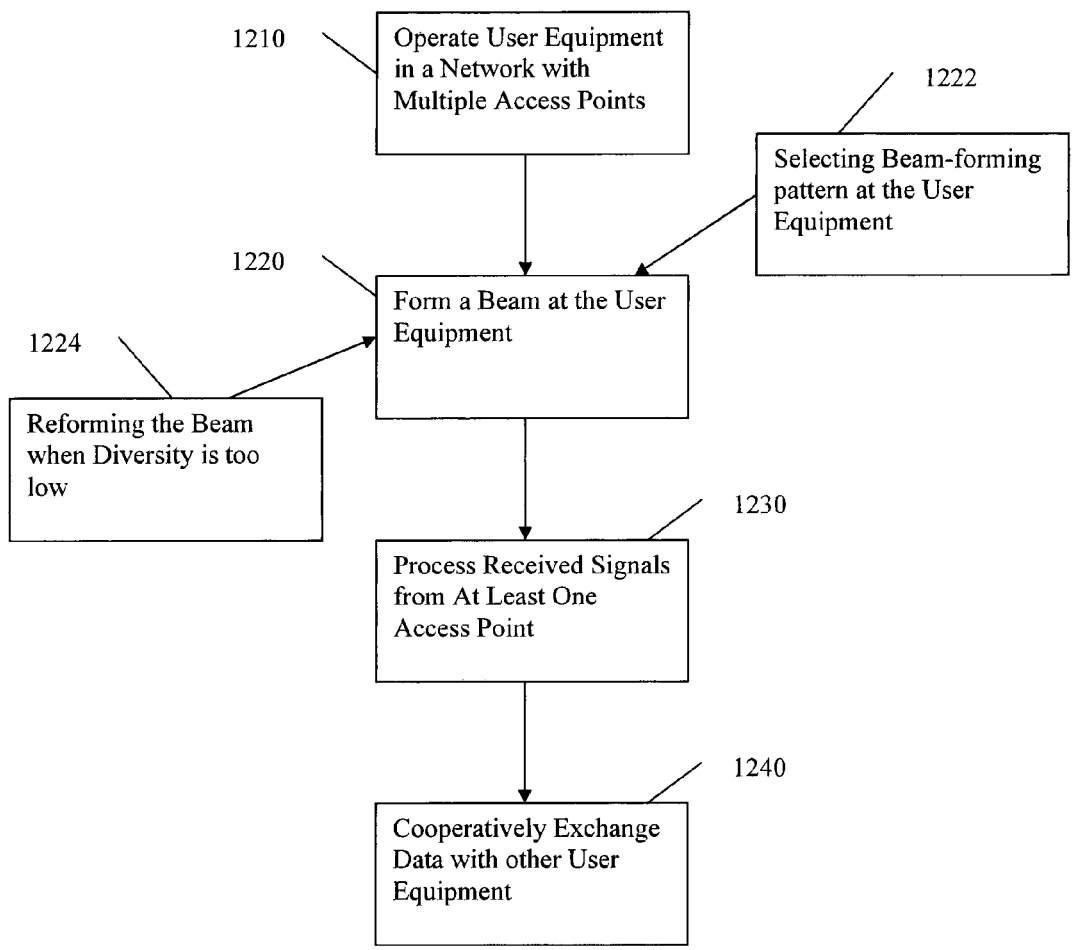
FIG. 12 illustrates another method according to certain embodiments of the present invention.

FIG. 12 illustrates another method according to certain embodiments of the present invention. As illustrated in FIG. 12, a method can include, at 1210, operating a user equipment of a plurality of user equipment in a network comprising a plurality of access points. The user equipment can be operated close to a group of the plurality of user equipment that are located close to one another. In other words, the user equipment and the plurality of user equipment can all be located close to one another.

The method can also include forming, at 1220, a beam by the user equipment. The method can additionally include selecting, at 1222, a beamforming pattern of the beam by the user equipment. Alternatively, or in addition, the forming the beam can include using a beamforming selected by the network. The forming the beam can be done in a random manner. The forming the beam can also include, at 1224, reforming the beam when it is detected that diversity amongst the plurality of user equipment is lower than desired.

The method can further include processing, at 1230, received signals from at least one of the plurality of access points at the user equipment. The forming the beam can be configured to let different user equipment of the plurality of user equipment to receive different signals from the plurality of access points to achieve diversity by using different beams amongst the plurality of user equipment. The method can also include, at 1240, cooperating with the plurality of user equipment to decode the received data. The cooperating with the plurality of user equipment can include exchanging different data respectively received by the plurality of user equipment and the user equipment. Another words, the various user equipment can exchange data so that all the user equipment share the same pool of data.

The received signals can be variously described as network coded signals, cooperative multiple input and multiple output signals, or signals from a single frequency network sending different signals from different base stations. It is not necessary that the received signals fall into all three categories.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   operating a user equipment of a plurality of user equipment in a network comprising a plurality of access points;
   forming a beam by the user equipment;
   processing received signals from at least one of the plurality of access points at the user equipment, wherein the forming the beam is configured to let different user equipment of the plurality of user equipment to receive different signals from the plurality of access points to achieve diversity by using different beams amongst the plurality of user equipment; and
   cooperating with the plurality of user equipment to decode, by the user equipment, received data, the decoded received data at least comprising data comprised in the received signals and data comprised in at least one of the received different signals.

2. The method of claim 1, wherein the operating the user equipment comprises operating user equipment close to a group of the plurality of user equipment that are located close to one another.

3. The method of claim 1, wherein cooperating with the plurality of user equipment comprises exchanging different data respectively received by the plurality of user equipment and the user equipment.

4. The method of claim 1, further comprising: selecting a beamforming pattern of the beam by the user equipment.

5. The method of claim 1, wherein forming the beam comprises using a beamforming selected by the network.

6. The method of claim 1, wherein the processing the received signals comprises processing network coded signals.

7. The method of claim 1, wherein the processing the received signals comprises processing cooperative multiple input and multiple output signals.

8. The method of claim 1, wherein the processing the received signals comprises processing signals from a single frequency network sending different signals from different base stations.

9. The method of claim 1, wherein the forming the beam comprises reforming the beam when it is detected that diversity amongst the plurality of user equipment is lower than desired.

10. An apparatus, comprising:
    at least one processor; and
    at least one memory including computer program code,
    wherein the at least one memory and computer program code are configured to, with the at least one processor, cause the apparatus at least to
    operate a user equipment of a plurality of user equipment in a network comprising a plurality of access points;
    form a beam by the user equipment;
    process received signals from at least one of the plurality of access points at the user equipment, wherein formation of the beam is configured to let different user equipment of the plurality of user equipment to receive different signals from the plurality of access points to achieve diversity by using different beams amongst the plurality of user equipment; and
    cooperate with the plurality of user equipment to decode, by the user equipment, received data, the decoded received data at least comprising data comprised in the received signals and data comprised in at least one of the received different signals.

11. The apparatus of claim 10, wherein the at least one memory and computer program code are configured to, with the at least one processor, cause the apparatus at least to operate the user equipment close to a group of the plurality of user equipment that are located close to one another.

12. The apparatus of claim 10, wherein the at least one memory and computer program code are configured to, with the at least one processor, cause the apparatus at least to cooperate with the plurality of user equipment by exchanging different data respectively received by the plurality of user equipment and the user equipment.

13. The apparatus of claim 10, wherein the at least one memory and computer program code are configured to, with the at least one processor, cause the apparatus at least to select a beamforming pattern of the beam.

14. The apparatus of claim 10, wherein the at least one memory and computer program code are configured to, with the at least one processor, cause the apparatus at least to form the beam using a beamforming selected by the network.

15. The apparatus of claim 10, wherein the at least one memory and computer program code are configured to, with the at least one processor, cause the apparatus at least to process the received signals as network coded signals.

16. The apparatus of claim 10, wherein the at least one memory and computer program code are configured to, with the at least one processor, cause the apparatus at least to process the received signals as cooperative multiple input and multiple output signals.

17. The apparatus of claim 10, wherein the at least one memory and computer program code are configured to, with the at least one processor, cause the apparatus at least to process the received signals as signals from a single frequency network sending different signals from different base stations.

18. The apparatus of claim 10, wherein the at least one memory and computer program code are configured to, with the at least one processor, cause the apparatus at least to form the beam in random manner.

19. The apparatus of claim 10, wherein the at least one memory and computer program code are configured to, with the at least one processor, cause the apparatus at least to reform the beam when it is detected that diversity amongst the plurality of user equipment is lower than desired.

20. A non-transitory computer readable medium encoded with instructions that, when executed in hardware, perform a process, the process comprising:

operating a user equipment of a plurality of user equipment in a network comprising a plurality of access points;

forming a beam by the user equipment;

processing received signals from at least one of the plurality of access points at the user equipment, wherein the forming the beam is configured to let different user equipment of the plurality of user equipment to receive different signals from the plurality of access points to achieve diversity by using different beams amongst the plurality of user equipment; and cooperating with the plurality of user equipment to decode, by the user equipment, received data, the decoded received data at least comprising data comprised in the received signals and data comprised in at least one of the received different signals.

* * * * *